United States Patent
Gessner et al.

(10) Patent No.: US 7,917,151 B2
(45) Date of Patent: Mar. 29, 2011

(54) FLEXIBLE NETWORK ARCHITECTURE WITH USER GROUP SUPPORT

(75) Inventors: Christina Gessner, Munich (DE); Alexander Pabst, Taufkirchen (DE); Gerald Tietscher, Freising (DE); Karsten Mohr, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 635 days.

(21) Appl. No.: 11/924,099

(22) Filed: Oct. 25, 2007

(65) Prior Publication Data

US 2008/0108378 A1    May 8, 2008

(30) Foreign Application Priority Data

Oct. 27, 2006   (EP) .................................. 06022503

(51) Int. Cl.
H04W 40/00 (2009.01)
H94M 11/00 (2006.01)
H04M 1/00 (2006.01)

(52) U.S. Cl. ............... 455/455; 455/403; 455/552.1; 455/553.1

(58) Field of Classification Search .......... 455/509, 455/517, 519, 507, 445, 524, 525, 552.1, 455/553.1, 416
See application file for complete search history.

(56) References Cited

U.S. PATENT DOCUMENTS

| | | | | |
|---|---|---|---|---|
| 5,666,661 | A * | 9/1997 | Grube et al. | 455/509 |
| 6,580,704 | B1 * | 6/2003 | Wellig et al. | 370/338 |
| 7,684,813 | B2 * | 3/2010 | Benson et al. | 455/517 |

FOREIGN PATENT DOCUMENTS

| | | |
|---|---|---|
| EP | 0849891 | 6/1998 |
| EP | 1089586 | 4/2001 |
| EP | 1304893 | 4/2003 |
| GB | 2396775 | 6/2004 |
| WO | WO 02/091622 | 11/2004 |

OTHER PUBLICATIONS

European Search Report for Application No. 06 02 2503, completed Apr. 13, 2007.

* cited by examiner

*Primary Examiner* — Tilahun Gesesse
(74) *Attorney, Agent, or Firm* — Ditthavong Mori & Steiner, P.C.

(57) ABSTRACT

A base station of a mobile communication network is connected to a core network and is operable in a normal mode and in a direct mode. The base station detects a request originating from a first user equipment to communicate with a second user equipment. The first user equipment is in direct reach of the base station. The base station establishes a communication link between the first and the second user equipment, and checks if the second user equipment is also within direct reach of the base station. The base station operates the communication link in direct mode, if yes, and operates the communication link in normal mode, otherwise.

10 Claims, 6 Drawing Sheets

FLEXIBLE NETWORK ARCHITECTURE WITH USER GROUP SUPPORT

FIELD OF THE INVENTION

The present invention relates to mobile communication networks. In particular, it relates to a flexible network architecture for mobile communication networks, with user group support.

TECHNICAL BACKGROUND

The ongoing concept work on future mobile communication systems reveals significant changes to the mobile network architecture. In order to make networks more efficient, provide higher data rates and throughput, and reduce latency in the network, new radio access technologies and network architectures are investigated, as e.g., in the context of UMTS LTE (Universal Mobile Telecommunications System Long Term Evolution).

At present, a UMTS network consists of three interacting domains; Core Network (CN), UMTS Terrestrial Radio Access Network (UTRAN) and User Equipment (UE), as shown in FIG. 1.

The main function of the core network is to provide switching, routing and transit for user traffic. The core network also contains the databases and network management functions. At present, the core network for UMTS is based on the GSM network with GPRS.

The UTRAN provides the air interface access method for User Equipment. It is subdivided into individual radio network systems (RNSs), where each RNS is controlled by a Radio Network Controller (RNC). The RNC is connected to a set of base stations (Node-B), each of which can serve one or several cells. The functions of the RNC are: radio resource control, admission control, channel allocation, power control settings, handover control, macro diversity, ciphering, segmentation/reassembly, broadcast signalling and open loop power control.

The functions of the base station (Node-B) are Air interface Transmission/Reception, Modulation/Demodulation, CDMA Physical Channel Coding, Micro Diversity, Error handling and closed-loop power control.

Regarding the evolved architecture in UMTS LTE (Long Term Evolution), FIG. 2 is a schematic illustration of the repartition of tasks in UMTS LTE. The eNode B handles Radio Resource Management: Radio Bearer Control, Radio Admission Control, Connection Mobility Control, Dynamic Resource Allocation (scheduling). The Mobility Management entity (MME) handles the distribution of paging messages to the eNBs, while the User Plane Entity (UPE) handles IP Header Compression and encryption of user data streams, termination of U-plane packets for paging reasons and switching of U-plane for support of UE mobility.

A more detailed description of the UMTS standard and its evolution may be found in the standardization documents of 3GPP, in particular the technical reports 3GPP TS 23.002 V7.1.0(2006-03), 3GPP TSTS 25.401 V3.0.0 (1999-10) and 3GPP TR 25.912 V7.0.0 (2006-06).

One direction in the long term evolution of UMTS networks is the increasing assignment of additional protocol functionality to the base station (Node-B), such as scheduling of radio resources, allocation of User Equipments (UEs), evaluation of measurements, radio bearer control, admission control and connection mobility control.

One the other side, operational costs of the network are still very much determined by the transport costs inside the network, e.g. between base station and other network nodes. Thus, data rates that could be possible with a given air interface design cannot be reached, because the bottleneck is behind the base station.

In this respect, existing networks for GSM, UMTS and also the planned extensions of UMTS currently only foresee one mode of operation involving a transfer of data via a core network connection.

Transfer of high data rates in current mobile networks may be very costly for the operator due to high backhaul/transport costs within the network. If the operator wants to make use of the capacity available on the air interface (100 Mbps planned in LTE, even more in 4G systems), the operator needs to provide according capacity within the network.

As another disadvantage, routing the communication via several network elements can introduce delays which are increasing the latency experienced by the user. However, low latency is one of the most important criteria for future data services (e.g., gaming, VoIP). There is currently little means for the operator to use the existing network architecture in a more flexible way.

SUMMARY OF THE INVENTION

In accordance with various embodiments of the present invention, a method is provided for operating a mobile communication system and a corresponding network element that reduces latency due to high network load.

It is proposed to introduce a "direct communication" mode which allows direct communication between the user equipments controlled by one base station. There is no need to route their traffic to the core network.

A method according to a first embodiment of the invention, carried out by a base station of a mobile communication network, the base station being connected to a core network and being operable in a normal mode and in a direct mode, may comprise the steps of detecting a request originating from a first user equipment to communicate with a second user equipment, the first user equipment being in direct reach of the base station, establishing a communication link between the first and the second user equipment, checking if the second user equipment is also within direct reach of the base station (NodeB) and, if yes, operating the communication link in direct mode, otherwise operating the communication link in normal mode. The step of operating the communication link in direct mode may be carried out without accessing the core network.

In another embodiment, the method may be preceded by the step of enabling that the communication link between the first and the second user equipment is operated in direct mode. The step of enabling may be carried out by the network operator. The step of enabling may further be carried out upon user request. The step of enabling may also be carried out depending on the load situation in the core network.

In yet another embodiment, the load situation of the network may be determined by measuring one or several of the following parameters: air interface load; transport interface load; mobility of the different users; and radio link quality.

The method may also be preceded by the step of providing a signal receivable by a user equipment and indicating that the base station is operable in direct mode. It may also be preceded by the step of signalling to a user equipment the presence of other user equipments within the reach of the base station.

A base station for a mobile communication network according to an embodiment of the invention may comprise means for detecting a request originating from a first user equipment to communicate with a second user equipment, the first user equipment being in direct reach of the base station; means for establishing a communication link between the first and the second user equipment; means for checking if the second user equipment is also within direct reach of the base station; means for operating the communication link in direct mode, if yes, and means for operating the communication link in normal mode, otherwise.

A user equipment (UE) according to an embodiment of the invention may comprise signal receiving means for receiving a signal indicating that a base station is operable in direct mode and display means for displaying that information to the user.

When introducing the direct communication mode very low latency can be achieved. Users can directly exploit full air interface capacity without any need for the operator to provide backhaul capacity for them. At the same time, existing functionalities of the base station are re-used, e.g. for scheduling and radio access control, so there is few new functions required in the base station or user equipment to support this mode. Also, it is always possible to use the normal mode of operation again and make use of the full network again, including roaming, full mobility, etc.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE FIGURES

These and other advantages, features and aspects of the present invention will become more evident when considering the following detailed description, in connection with the figures in which.

DETAILED DESCRIPTION

The method and the network element operate in two different modes: normal mode and direct mode.

Figure 1:
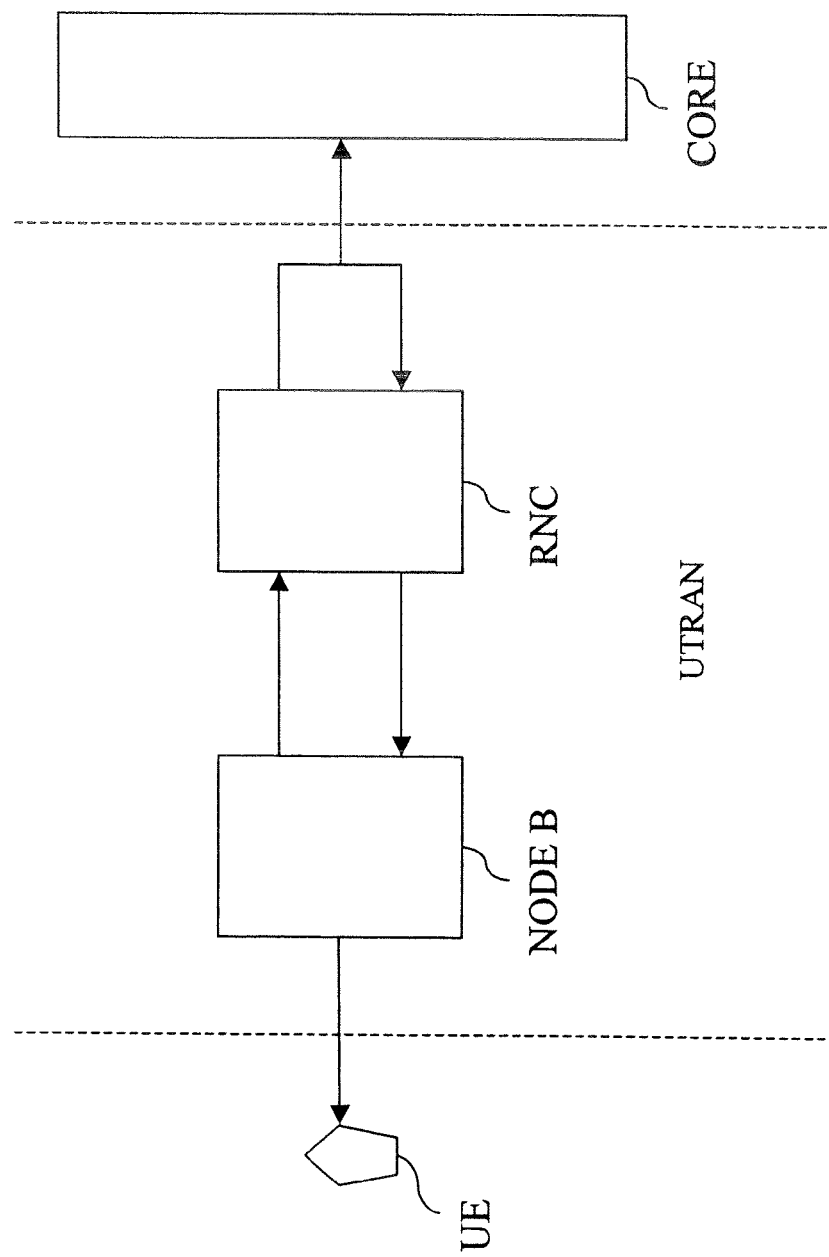
FIG. 1 is a schematic diagram of a general UMTS network architecture, according to an exemplary embodiment.
Figure 2:
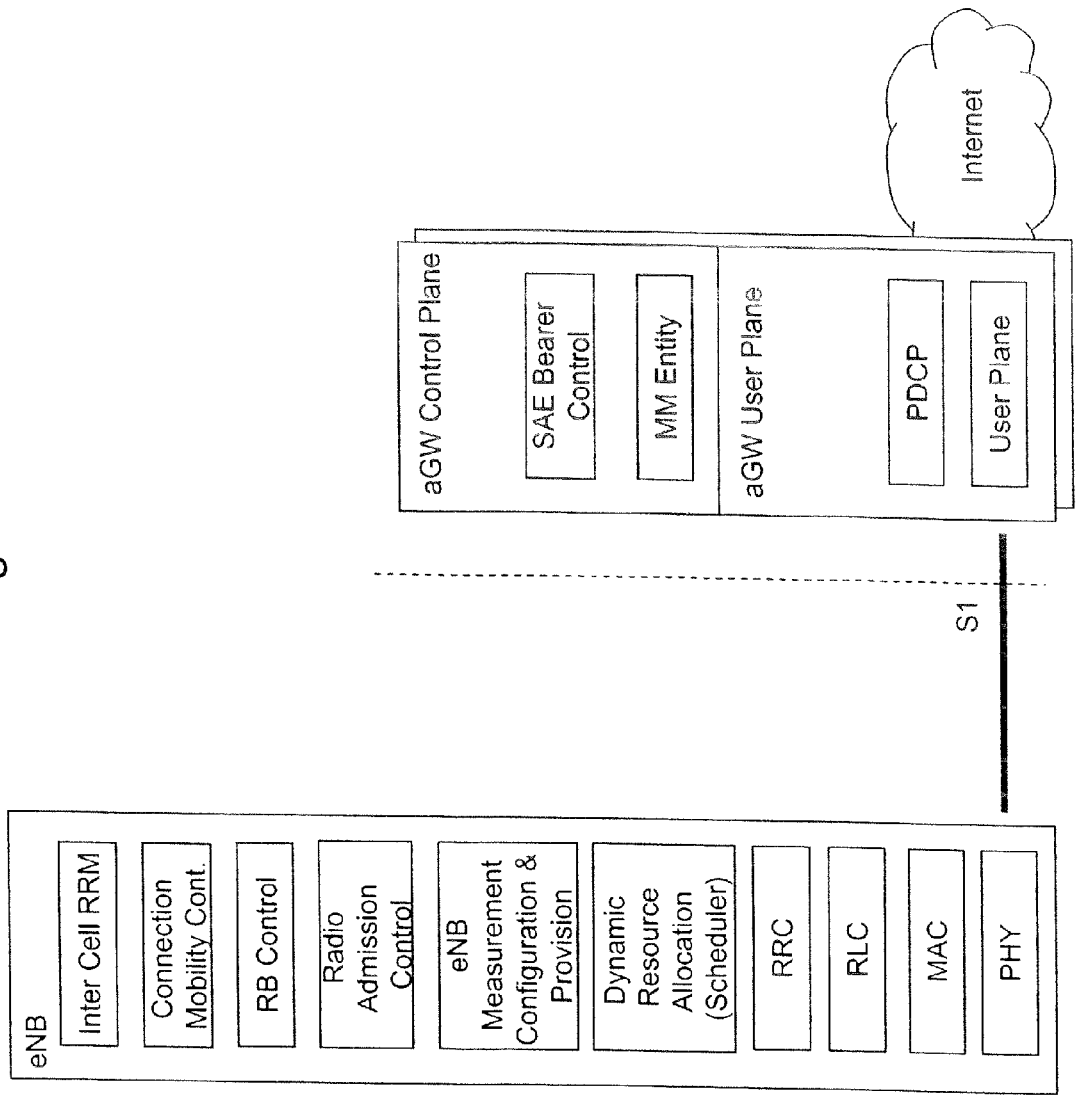
FIG. 2 is a schematic illustration of the repartition of tasks in UMTS LTE, according to an exemplary embodiment.
Figure 3:
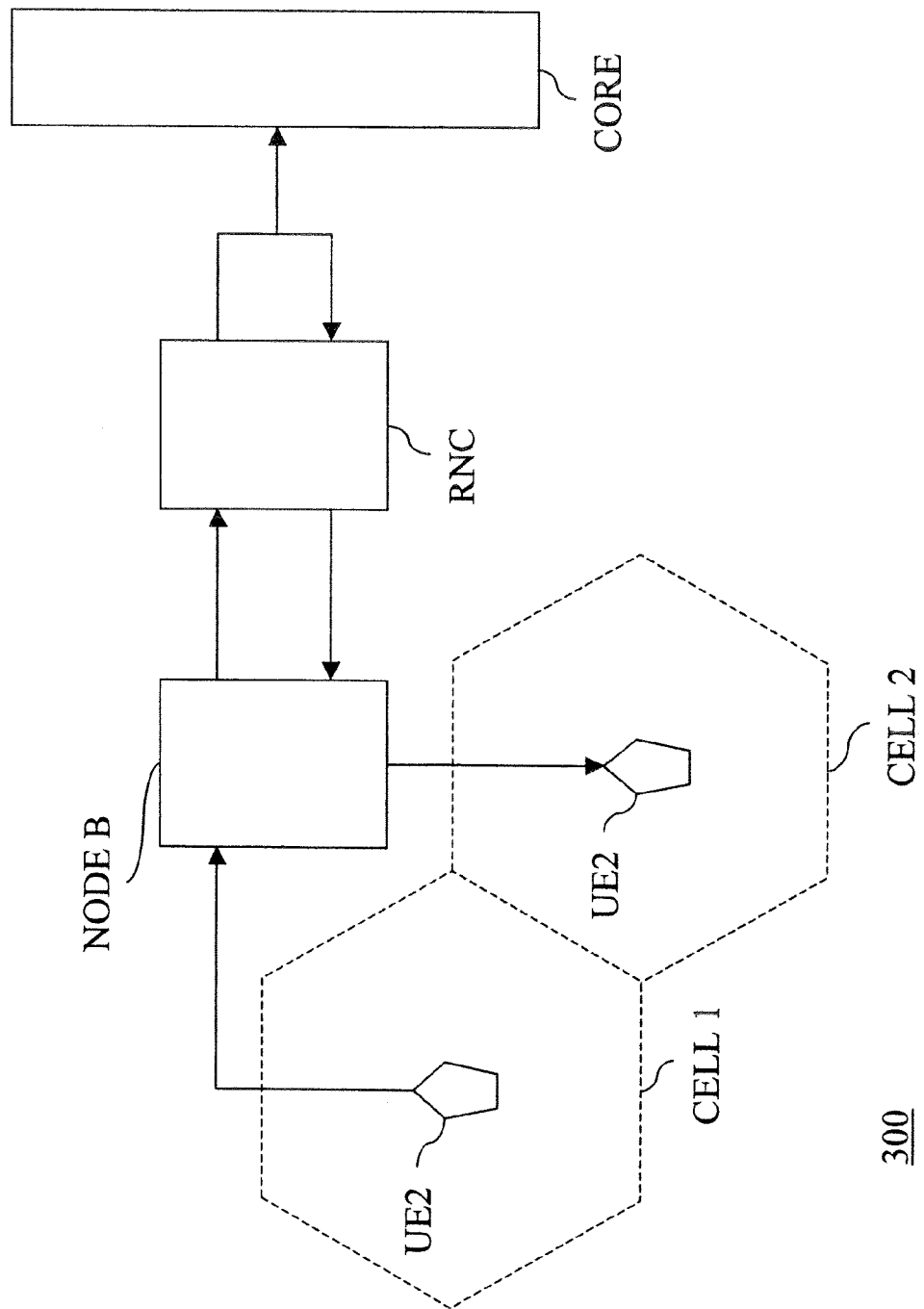
FIG. 3 is a schematic diagram showing call/connection handling in normal mode, according to an exemplary embodiment.

FIG. 3 is a schematic diagram showing call/connection handling in normal mode according to the state of the art. A call originating from a first User Equipment (UE1) is routed over the base station (NODE B) and the Radio Network Control (RNC) to the core network (CORE) and from there back over the same Radio Network Control (RNC) and base station (NODE B) to the second user equipment (UE2).

The base station (NODE B) is aware or may automatically find out that the second user equipment (UE2) to which the call is to be routed, is within the reach of the base station, be it in the same cell or in two logically separate cells. However, regardless of this fact, in normal mode the base station routes the call to the core network.

Figure 4:
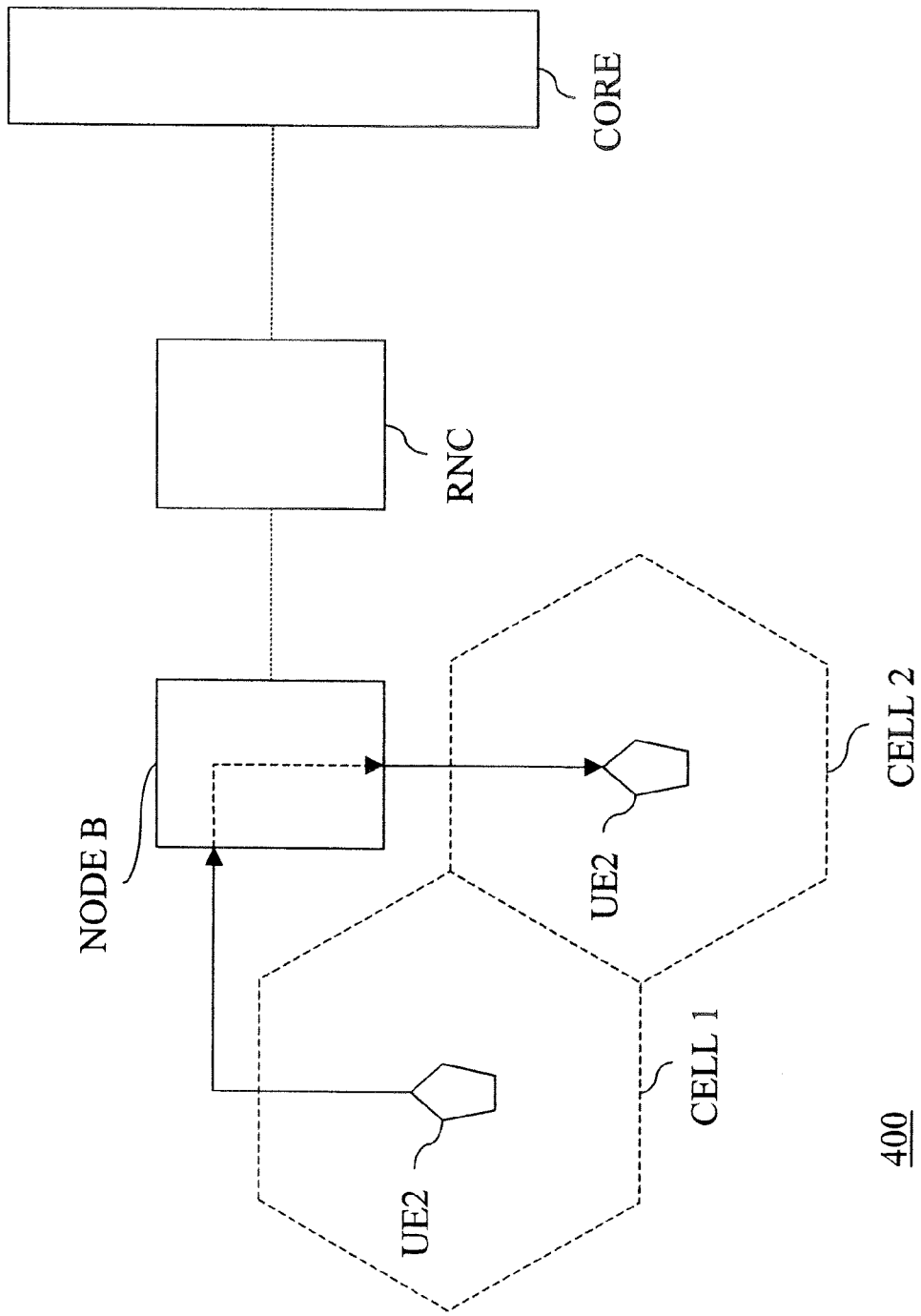
FIG. 4 is a schematic diagram showing call/connection handling in direct mode, according to an exemplary embodiment.

FIG. 4 is a schematic diagram showing in principle the operation of the network according to an embodiment of the invention, now in direct mode. Unlike in FIG. 3, the call originating from the first User Equipment (UE1) is now routed directly from the base station to the second User Equipment (UE2).

A precondition for this mode is that both User Equipments (UE1, UE2) are within the reach of the same base station (NODE B).

To enable this mode, specific signalling elements are proposed for the communication between the user equipments and between user equipments and the base station, which may also be derived from existing identifiers already known in the base station, of which most of them are directly taken from GSM specifications:
International Mobile Subscriber Identity (IMSI)
Temporary Mobile Subscriber Identity (TMSI)
Packet Temporary Mobile Subscriber Identity (P-TMSI)
Temporary Logical Link Identity (TLLI)
Mobile Station ISDN (MSISDN)
International Mobile Station Equipment Identity (IMEI)
International Mobile Station Equipment Identity and Software Number (IMEISV)

Alternatively, IP-addresses could be used. Furthermore, identifiers used in the base station for conveying scheduling decisions to the users could be re-used.

Also, there may be means of signalling to a User Equipment (UE), whether this mode is used or not, or whether it is available or not. This allows the User Equipment (UE) to indicate to the base station whether they want to make use of this mode or not. Also, the User Equipment (UE) may indicate to the base station a list of users to whom they would like to communicate in this way. Alternatively, the network may offer a list of users to the User Equipment (UE) to indicate for which users this mode is currently available.

Figure 5:
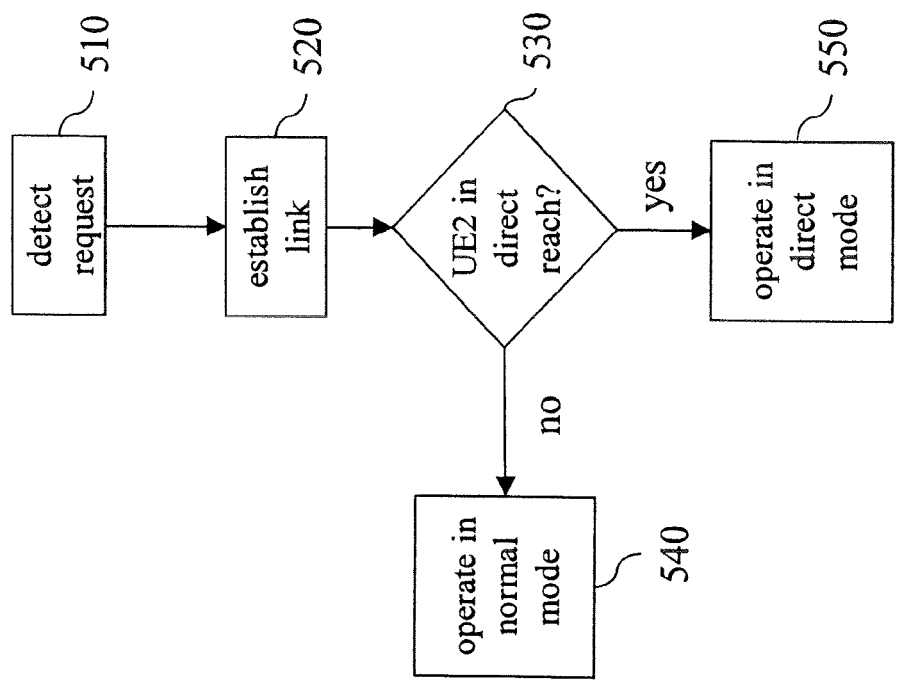
FIG. 5 is a flowchart of a method according to an embodiment of the present invention.

FIG. 5 is a flowchart showing an embodiment of a method for operating a base station of a mobile communications network in direct mode. It is assumed that the base station is connected to a core network as described above.

In step 510, the base station detects a request originating from a first user equipment (UE1) to communicate with a second User Equipment (UE2), wherein the first User Equipment is within reach of the base station (NODE B).

In step 520, the base station establishes a communication link between the first and the second User Equipment (UE1, UE2). Here, the core network needs to establish a context and the initiation of the direct mode should be done in negotiation between base station and core network. In other words, the core network is involved during the regular attach procedures and establishment of the call, but will not be involved in the data transfer later on.

In step 530, the base station checks whether the second user equipment is also within its reach. In another embodiment of the invention, this may be done in negotiation with the core network. In yet another embodiment, the core network may indicate to the base station upon establishment of the bearers for one user whether the data transfer for this user is within the responsibility of the base station or not. In still another embodiment, the base station may have the capability of proposing the use of direct mode to the core network.

If yes, then the base station operates the communication link in direct mode in step 550. Otherwise, the base station operates the communication link in normal mode in step 540.

In a further embodiment of the invention, the operator may decide, based on the load situation in the network, whether direct mode should be used for some of the users controlled by one base station. This decision may be made in different parts of the network, and may be of static or dynamic nature. In order to implement this decision, load measurements on transport and air interface, or mobility and radio link quality evaluations of the different users may be used. This scenario may be beneficial in heavy traffic situations, e.g. in stadiums, to take load away from the core network.

It may be transparent to users whether this mode is used or not. There may be cases, where the users would like to know whether it is available, e.g. a group of gaming players, who want to rely on a good latency situation with fair conditions among the users. Similarly, users may directly request to the network that they want to make use of this mode. Also there may be users that know they won't require this mode (only "external" communication), and they may indicate this to the network.

A base station supporting direct mode of communication may be provided to a user group, e.g. an office, and the users can communicate with each other in direct mode, and to external users in normal mode.

The feature may be combined with special group tariffs, so that all users in a group are charged as a group. This solves the issue of not being able—in the core network—to track the traffic over the base station in direct mode.

The feature may be combined with location/presence services, so that users may be aware who else is nearby and is using/may use this feature. Then, the user may for example decide to send gaming or a chat invitation to another user.

Figure 6:
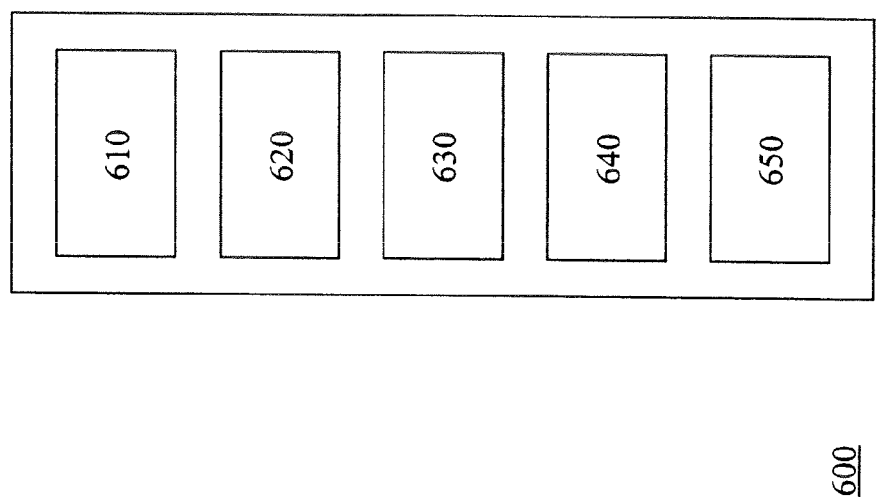
FIG. 6 is a block diagram of a base station according to an exemplary embodiment.

FIG. 6 is a block diagram of a base station (NODE B) according to one embodiment of the invention.

It is a precondition of the present invention, according to certain embodiments, that all functions necessary for handling the transfer of data from the first User Equipment UE1 to the second User Equipment UE2, that is the operation of the base station in direct mode, are located in the base station (Node B).

Accordingly, the base station is equipped with means 610 for detecting a request originating from a first user equipment UE1 to communicate with a second user equipment UE2, the first user equipment UE1 being in direct reach of the base station NodeB.

The base station further comprises means 620 for establishing a communication link between the first and the second user equipment UE1 and UE2.

The base station further comprises means 630 for checking if the second user equipment UE2 is also within direct reach of the base station (NodeB) as well as means 650 for operating the communication link in direct mode, if yes, and means 640 for operating the communication link in normal mode, otherwise.

In another embodiment of the invention, the base station may further comprise means for negotiating the establishment of the direct mode with the core network, means for maintaining a list of users and their contexts who are in direct mode, means for directly transferring user data between these users based on specific identifiers, means of switching a user between direct mode and normal mode based on negotiation with the core network. Additionally, a base station may comprise signalling protocol elements, e.g., for indicating that direct mode is available in a cell.

The invention claimed is:

1. A method, carried out by a base station of a mobile communication network, the base station being connected to a core network and being operable in a normal mode and in a direct mode, comprising:

detecting a request originating from a first user equipment to communicate with a second user equipment, the first user equipment being in direct reach of the base station, establishing a communication link between the first user equipment and the base station and between the base station and the second user equipment, checking if the second user equipment is also within direct reach of the base station, operating the communication link in direct mode without accessing the core network and routing a call originating from a first user equipment directly from the base station to the second user equipment if yes; and operating the communication link in normal mode, which is routing a call originating from the first user equipment over the base station to the core network and back over the base station to the second user equipment, otherwise.

2. A method according to claim 1, preceded by the step of enabling that the communication link between the first and the second user equipment is operated in direct mode.

3. A method according to claim 2, wherein the step of enabling is carried out by the network operator.

4. A method according to claim 3, wherein the step of enabling is carried out upon user request.

5. A method according to claim 3, wherein the step of enabling is carried out depending on the load situation in the core network.

6. A method according to claim 5, wherein the load situation of the network is determined by measuring one or several of the following parameters:

air interface load;
   transport interface load;
   mobility of the different users; and
   radio link quality.

7. A method according to claim 1, preceded by the step of providing a signal receivable by a user equipment and indicating that the base station is operable in direct mode.

8. A method according to claim 1, preceded by the step of signalling to a user equipment the presence of other user equipments within the reach of the base station.

9. A base station for a mobile communication network, comprising:

means for detecting a request originating from a first user equipment to communicate with a second user equipment, the first user equipment being in direct reach of the base station, means for establishing a communication link between the first user equipment and the base station and between the base station and the second user equipment, means for checking if the second user equipment is also within direct reach of the base station, means for operating the communication link in direct mode without accessing a core network and a call originating from the first user equipment is routed directly from the base station to the second user equipment, if yes; and means for operating the communication link in normal mode, which is routing a call originating from the first user equipment over the base station to the core network and back over the base station to the second user equipment, otherwise.

10. User equipment comprising:

signal receiving means for receiving a signal indicating that a base station is operable in direct mode and display means for displaying that information to the user and allowing the user to indicate to the base station whether it wants to make use of the direct mode or not.

* * * * *